United States Patent [19]

Gil Soriano

[11] Patent Number: 5,730,788
[45] Date of Patent: Mar. 24, 1998

US005730788A

[54] CORRECTION PRODUCT

[76] Inventor: Enrique Gil Soriano, Madrazo 81, Barcelona, Spain, 08006

[21] Appl. No.: 632,344

[22] Filed: Apr. 10, 1996

Related U.S. Application Data

[63] Continuation of Ser. No. 503,538, Jul. 18, 1995, abandoned, which is a continuation of Ser. No. 178,213, Jan. 5, 1994, abandoned.

[51] Int. Cl.$^6$ .................................................. C09D 11/00
[52] U.S. Cl. .................................. 106/31.07; 106/31.01; 106/31.08
[58] Field of Search ............................ 106/19 A, 19 B, 106/31.01, 31.07, 31.08

[56] References Cited

U.S. PATENT DOCUMENTS

| | | | |
|---|---|---|---|
| 3,360,489 | 12/1967 | Grossman et al. | 106/31.07 |
| 3,409,574 | 11/1968 | Gros | 106/31.09 |
| 4,440,745 | 4/1984 | Schmidt et al. | 510/395 |
| 4,859,242 | 8/1989 | Hughes et al. | 106/31.04 |
| 4,920,091 | 4/1990 | Iwakura et al. | 427/150 |
| 5,084,098 | 1/1992 | Olson | 106/31.09 |
| 5,147,457 | 9/1992 | Hino et al. | 106/31.93 |
| 5,318,622 | 6/1994 | Kitazawa et al. | 106/31.11 |
| 5,403,872 | 4/1995 | Koreska | 106/271 |

FOREIGN PATENT DOCUMENTS

| | | | |
|---|---|---|---|
| 3421408 | 1/1986 | Germany | 106/31.09 |
| 53-77720 | 7/1978 | Japan | 106/31.09 |
| 62-207308 | 9/1987 | Japan . | |
| 62-288673 | 12/1987 | Japan | 106/31.09 |
| 63-57683 | of 1988 | Japan | 106/31.09 |
| 90/04621 | 5/1990 | WIPO | 106/31.09 |

OTHER PUBLICATIONS

Chemical Abstract 108:132,494, abstract of JP 62-207,308, Sep. 1987.
Chemical Abstracts Registry No. 26022-09-03, Common Name: Discoat N 14, no date.

*Primary Examiner*—Mark L. Bell
*Assistant Examiner*—Scott L. Hertzog
*Attorney, Agent, or Firm*—Jacobson, Price, Holman & Stern, PLLC

[57] ABSTRACT

Correction products known in the art are typically in a liquid form which are applied to a surface by a small brush. However, the present invention provides a correction product in the form of a bar that can be directly and easily applied to a desired surface. The present invention provides a correction product in the form of a bar having a composition compound of (a) 30–60 wt. % pigment; (b) 5–20 wt. % gelifying agent; (c) 0.5–10 wt. % adhesive resin; (d) 10–40 wt. % water; and (e) 0.5–5 wt. % emulsifier, and a method of producing the same.

1 Claim, No Drawings

CORRECTION PRODUCT

This is a Continuation of application Ser. No. 08/503, 538, filed Jul. 18, 1995, now abandoned, which in turn is a continuation of application Ser. No. 08/178,213 filed Jan. 5, 1994, now abandoned.

BACKGROUND OF THE PRIOR ART

It has now been discovered, surprisingly, that by introducing certain modifications to the composition and method of making the described adhesive bars, it is possible to obtain a correction product in the form of a bar. A correction product in the form of a bar may be used advantageously in place of correction products in liquid form which are currently used for correcting typing errors and for other applications by draftsmen, graphic artists, designers, etc. Known correction products, such as, liquid products, are applied with a small paintbrush, over the letters, symbols, lines or marks which it is sought to conceal, and which when dried, i.e., when the solvent component of the liquid product has evaporated, forms an opaque covering which adheres perfectly to the paper or other laminar substrate, and is then ready to receive new letters, symbols, or lines as desired. However, it would be an advantage if this application could be by simple rubbing with a solid bar rather than painting on with a brush.

SUMMARY OF THE INVENTION

This invention relates to a correction product in the form of a bar (hereinafter referred to as a correction bar) which simplifies application of a correction product to a desired surface. The present invention comprises decreasing, by a certain percentage, the proportion of autoadhesive resin in the formulation of the preferred known adhesive bars, and adding to the formulation opaque pigments, preferably white, although it is envisaged that different pigments would be used for use of the correction bar on different colored surfaces, giving the correction bar its covering power. The pigments are dispersed in the formulation with the aid of surface active agents.

According to the invention, the general composition of the preferred form of solid correction bar is as follows:

30% to 60% pigment;

5% to 20% gelifying agent;

(c) 0.5% to 10% adhesive resin;

(d) 10% to 40% water; and (e) 0.5% to 5% emulsifier; wherein all percentages are by weight.

Regarding component (a) for a white pigment, the best results have been obtained with titanium dioxide, which can be potentiated in its effects by addition of other inorganic materials (extenders) such as calcium carbonate, calcium oxide, talc or alumina or extenders such as carbohydrates.

Regarding component (b), the gelifying agent, various sodium- and ammonium salts of fatty acids containing 12–24 C atoms have been tested, with the best results having been obtained with sodium stearate.

Regarding component (c), the adhesive resin, it is possible to use a whole range of resins or mixtures of resins, such as, polyvinyl pyrrolidone, acrylic resins or the like, urea-formaldehyde resins, cellulosic resins, etc.

Finally, regarding component (e), it is possible to use a number of different emulsifiers, which are available, depending on the specifics of the formulation selected.

In a further aspect, the present invention relates to a method of making a correction bar. This method comprises the following steps:

(a) dispersing a pigment and at least one extender in water, by means of high speed agitation, with emulsifier being added at the beginning of the operation;

(b) mixing the dispersion, while heating at a temperature of between about 80°90° C., with an adhesive resin and gelifier, until total dissolution occurs; and (c) delivering a measured amount of the product, heated to about 90° C., into containers and allowing to cool in said containers until the product solidifies.

It is envisaged that the containers used in the above method could also be used for the sale and marketing of the correction bar.

A preferred embodiment of the present invention will be given by way of example.

EXAMPLE 1

50 [wt.]% titanium dioxide

34 [wt.]% water

13 [wt.]% sodium stearate

2 [wt.]% "K-90" polyvinyl pyrrolidone

1 [wt.]% ARCOPAL-160 (polyglycolic nonlifenol ether) (Hoechst).

The bar is made from these components by means of the method described supra.

I claim:

1. A correction product in the form of a bar such that in use when the bar is applied to a surface having a marking thereon, the bar deposits an opaque coating which conceals the marking and the coating is capable of receiving further markings thereon, characterized in that the composition of the bar consists essentially of:

(a) 50 wt. % titanium oxide;

(b) 13 wt. % sodium stearate;

(c) 2 wt % polyvinylpyrrolidone;

(d) 34 wt. % water; and (e) 1 wt. % ARCOPAL-160 (polyglycolic nonlifenol ether).

* * * * *